(12) United States Patent
Hudson et al.

(10) Patent No.: US 10,341,011 B2
(45) Date of Patent: Jul. 2, 2019

(54) APPARATUS AND METHOD FOR COMMUNICATIONS MANAGEMENT

(71) Applicant: BAE SYSTEMS PLC, London (GB)

(72) Inventors: Peter Noble Hudson, Preston (GB); Rania Hamdi Eissa, Preston (GB); Monadl Abd Al-Abbas Mansour Al-Ameri, Preston (GB)

(73) Assignee: BAE Systems plc, London (GB)

( * ) Notice: Subject to any disclaimer, the term of this patent is extended or adjusted under 35 U.S.C. 154(b) by 8 days.

(21) Appl. No.: 15/749,633

(22) PCT Filed: Aug. 5, 2016

(86) PCT No.: PCT/GB2016/052401
§ 371 (c)(1),
(2) Date: Feb. 1, 2018

(87) PCT Pub. No.: WO2017/025724
PCT Pub. Date: Feb. 16, 2017

(65) Prior Publication Data
US 2018/0227040 A1    Aug. 9, 2018

(30) Foreign Application Priority Data

Aug. 13, 2015 (GB) .................................. 1514459.5
Sep. 3, 2015 (EP) .................................... 15183731

(51) Int. Cl.
*H04L 12/26* (2006.01)
*H04B 7/185* (2006.01)
(Continued)

(52) U.S. Cl.
CPC ....... *H04B 7/18506* (2013.01); *B64C 39/024* (2013.01); *G05D 1/0022* (2013.01);
(Continued)

(58) Field of Classification Search
USPC ................ 370/216, 241, 242, 248, 252, 316
See application file for complete search history.

(56) References Cited

U.S. PATENT DOCUMENTS 2,062,003 A    11/1936  Hammond, Jr.
4,100,472 A    7/1978   Mobley
(Continued)

FOREIGN PATENT DOCUMENTS

EP    0481171 A2    4/1992
EP    0532383 A1    3/1993
(Continued)

OTHER PUBLICATIONS

International Preliminary Report on Patentability of International Application No. PCT/GB2016/052371, dated Feb. 22, 2018, 10 pages.
(Continued)

*Primary Examiner* — Kwang B Yao
*Assistant Examiner* — Nguyen H Ngo
(74) *Attorney, Agent, or Firm* — Maine Cernota & Rardin

(57) ABSTRACT

Apparatus for on-board management of communications in a mobile node comprising a communications system configured to effect wireless data communication between the mobile node and another node by means of at least one supported wireless communications link, wherein the apparatus comprises a node manoeuvre planning module and a dynamic route planner; the node manoeuvre planning module being configured to:
  identify that a wireless communications link associated with the mobile node (i) has been lost, degraded or is otherwise not optimal, and/or (ii) would violate an emissions control restriction;
  define a desired wireless communications link between the mobile node and the other node to (i) support
(Continued)

wireless communications therebetween, and/or (ii) comply with the emissions control restriction;

determine an attitude and/or position of the mobile node with respect to the other node required to support the desired wireless communications link;

derive a node manoeuvre plan including data representative of the determined attitude and/or position of the mobile node and generate a plan metric in respect of the node manoeuvre plan; and transmit node manoeuvre plan data to the dynamic route planner, wherein the node manoeuvre plan data is configured to cause the dynamic route planner (11) to derive a route plan designed to manoeuvre the mobile node to the determined attitude and/or position; the dynamic route planner being configured to:

in response to receipt of the node manoeuvre plan data, generate a route plan designed to manoeuvre the mobile node to the determined attitude and/or position and generate corresponding route plan data; and provide the route plan data and data representative of the plan metric to a node authority with a request for authorisation.

10 Claims, 3 Drawing Sheets

(51) Int. Cl.
*G05D 1/10* (2006.01)
*G05D 1/00* (2006.01)
*G08G 5/00* (2006.01)
*B64C 39/02* (2006.01)

(52) U.S. Cl.
CPC .......... *G05D 1/101* (2013.01); *G08G 5/0034* (2013.01); *G08G 5/0039* (2013.01); *G08G 5/0069* (2013.01); *B64C 2201/146* (2013.01)

(56) References Cited

U.S. PATENT DOCUMENTS

| | | | |
|---|---|---|---|
| 6,026,097 A | 2/2000 | Voois | |
| 6,115,580 A | 9/2000 | Chuprun et al. | |
| 7,072,977 B1 | 7/2006 | Bernard et al. | |
| 7,151,749 B2 | 12/2006 | Vega-Garcia | |
| 8,005,418 B2 | 8/2011 | Walker | |
| 8,554,264 B1 | 10/2013 | Gibbons et al. | |
| 9,412,278 B1* | 8/2016 | Gong | G06F 16/29 |
| 2002/0142773 A1 | 10/2002 | Rudrapatna et al. | |
| 2002/0164981 A1 | 11/2002 | Parkman | |
| 2003/0073406 A1 | 4/2003 | Benjamin | |
| 2003/0114195 A1 | 6/2003 | Chitrapu | |
| 2005/0202827 A1 | 9/2005 | Demarco et al. | |
| 2006/0030350 A1 | 2/2006 | Mitchell | |
| 2006/0168592 A1 | 7/2006 | Andrews et al. | |
| 2007/0064604 A1 | 3/2007 | Chen | |
| 2007/0129855 A1* | 6/2007 | Coulmeau | G08G 5/0039 701/3 |
| 2007/0168090 A1 | 7/2007 | DeMarco et al. | |
| 2007/0258445 A1 | 11/2007 | Smith | |
| 2007/0258486 A1 | 11/2007 | Smith | |
| 2007/0291647 A1 | 12/2007 | Smith | |
| 2007/0291767 A1 | 12/2007 | Smith | |
| 2007/0291768 A1 | 12/2007 | Galliscio | |
| 2007/0291780 A1 | 12/2007 | Smith | |
| 2007/0297416 A1 | 12/2007 | Boley | |
| 2008/0026767 A1 | 1/2008 | Krstulich | |
| 2008/0204279 A1 | 8/2008 | Bourgault | |
| 2009/0079631 A1 | 3/2009 | Hurst | |
| 2009/0185617 A1 | 7/2009 | Houghton et al. | |
| 2009/0326735 A1 | 12/2009 | Wood | |
| 2010/0057278 A1 | 3/2010 | Lee | |
| 2010/0094485 A1 | 4/2010 | Verlut et al. | |
| 2010/0220648 A1 | 9/2010 | Persson | |
| 2010/0278086 A1 | 11/2010 | Pochiraju | |
| 2010/0323715 A1 | 12/2010 | Winters | |
| 2011/0090835 A1 | 4/2011 | Furukawa | |
| 2011/0255506 A1 | 10/2011 | Toth | |
| 2012/0078453 A1 | 3/2012 | Daum et al. | |
| 2012/0257657 A1 | 10/2012 | Subrahmanya et al. | |
| 2012/0268319 A1 | 10/2012 | Mitchel | |
| 2013/0041529 A1 | 2/2013 | He | |
| 2013/0095822 A1 | 4/2013 | Swardh | |
| 2013/0324070 A1 | 12/2013 | Bennett et al. | |
| 2014/0014787 A1 | 1/2014 | Chen | |
| 2014/0075506 A1 | 3/2014 | Davis | |
| 2014/0105054 A1 | 4/2014 | Saegrov et al. | |
| 2014/0142787 A1 | 5/2014 | Tillotson | |
| 2014/0218239 A1 | 8/2014 | Sharawi et al. | |
| 2014/0226584 A1 | 8/2014 | Cullen et al. | |
| 2014/0274180 A1 | 9/2014 | DuBois et al. | |
| 2014/0323038 A1 | 10/2014 | Hubbel et al. | |
| 2015/0043337 A1 | 2/2015 | Kanamarlapudi | |
| 2015/0102953 A1 | 4/2015 | Stayton | |
| 2015/0120087 A1 | 4/2015 | Duan | |
| 2015/0131513 A1 | 5/2015 | Lauer | |
| 2015/0210387 A1 | 7/2015 | Ling | |
| 2015/0229376 A1 | 8/2015 | Kikuchi | |
| 2016/0140851 A1* | 5/2016 | Levy | G08G 5/0069 701/3 |
| 2016/0232795 A1* | 8/2016 | Thiele | G05D 1/0022 |
| 2016/0261989 A1* | 9/2016 | Pitcher | H04W 4/029 |
| 2017/0034277 A1 | 2/2017 | Jackson | |
| 2017/0229023 A1* | 8/2017 | Connor | H04W 84/18 |
| 2017/0283038 A1 | 10/2017 | Lin | |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052374, dated Feb. 22, 2018, 8 pages.

International Preliminary Report on Patentability of International Application No. PCT/GB2016/052484, dated Feb. 22, 2018, 7 pages.

International Preliminary Report on Patentability of International Application No. PCT/GB2016/052480, dated Feb. 22, 2018, 8 pages.

International Preliminary Report on Patentability of International Application No. PCT/GB2016/052481, dated Feb. 22, 2018, 8 pages.

International Preliminary Report on Patentability of International Application No. PCT/GB2016/052401, dated Feb. 22, 2018, 8 pages.

(56) References Cited

OTHER PUBLICATIONS

International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Preliminary Report on Patentability of International Application No. PCT/GB2016/052379, dated Feb. 22, 2018, 7 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.
Chen-Mou Cheng et al: "Transmit Antenna Selection Based on Link-layer Channel Probing", World of Wireless, Mobile and Multimedia Networks, 2007. Wowmum 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.

* cited by examiner

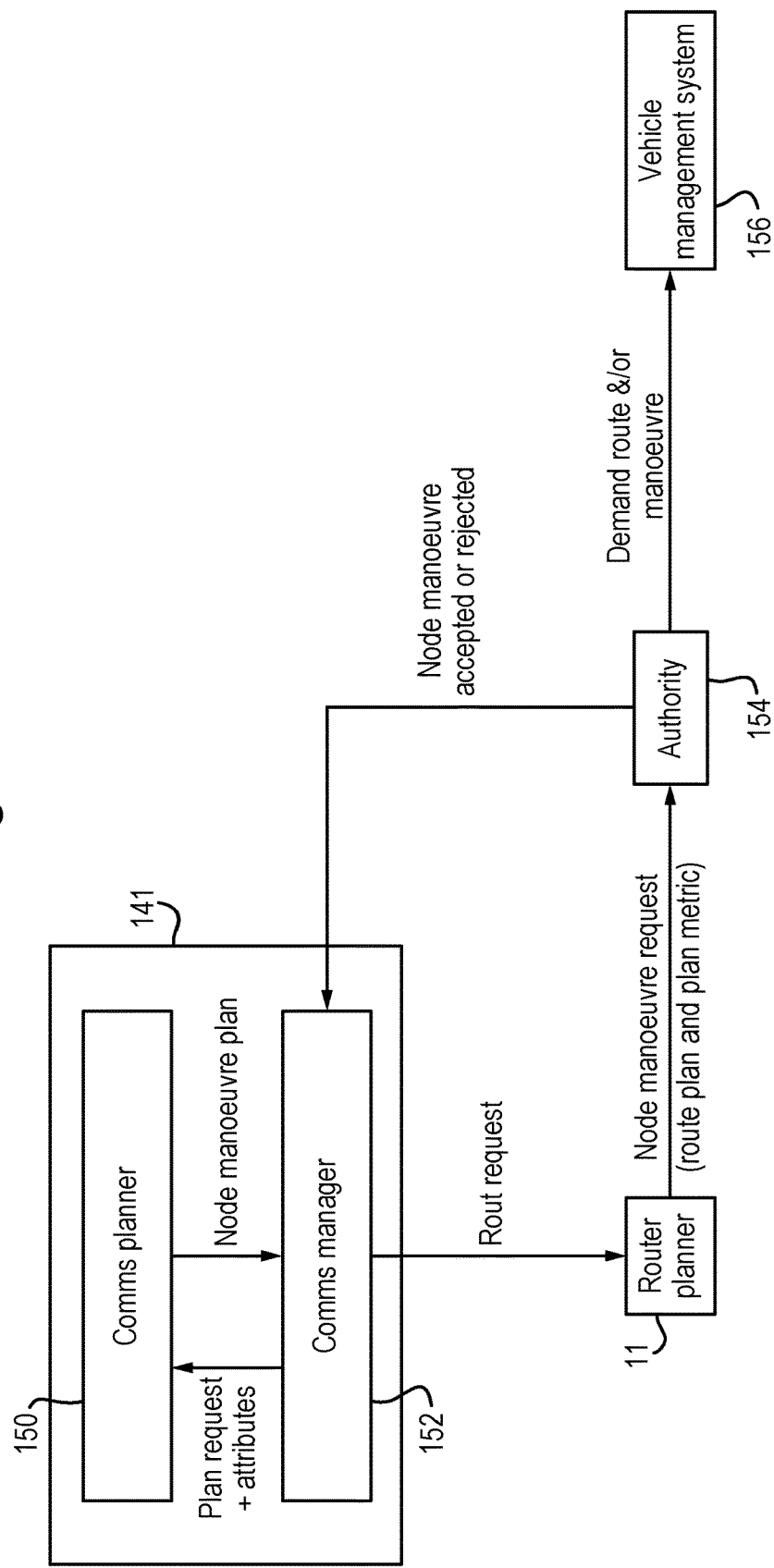

APPARATUS AND METHOD FOR COMMUNICATIONS MANAGEMENT

RELATED APPLICATIONS

This application is a National Phase application filed under 35 USC § 371 of PCT Application No. PCT/GB2016/052401 with an International filing date of Aug. 5, 2016, which claims priority of GB Patent Application GB1514459.5 filed Aug. 13, 2015 and EP Patent Application EP15183731.7 filed Sep. 3, 2015. Each of these applications is herein incorporated by reference in their entirety for all purposes.

FIELD OF THE INVENTION

This invention relates generally to an apparatus and method for communications and information management and, more particularly, but not necessarily exclusively, to an apparatus and method for management of wireless communications resources between a moving platform and at least one recipient node.

BACKGROUND

There are many applications in which it is required to apply a level of management in respect of wireless communications resources and the management of information, particularly between a moving platform and a remote recipient, and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communication link between the aerial vehicle and a ground station, for example, and unexpected loss or degradation of such a communication link, can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, Payload and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, pop-up threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective, and it would be desirable to provide an intelligent communications management system that is able to adapt and respond dynamically to unplanned events, such as link degradation or failure, new operational constraints, or changes in mission priorities, in order to meet pre-planned mission objectives during mission execution.

For example, in the case of a moving platform system such as an unmanned aircraft system (UAS), it may be determined, during mission execution, that two nodes are not optimally oriented with respect to each other to achieve a required information exchange, or the quality of the communications link between them is constrained due to interference, for example. In other applications, such as mobile phone networks, it is not unusual for a user to find themselves at a location where they have no, or minimal, mobile network signal, due to interference for example. It would therefore be desirable to change the orientation of the platform with respect to another node, or the location of the user, in order to optimise communications.

US2014/0142787 describes a method and system onboard a UAV for enabling it to choose a flight path in the event of an in-flight contingency (e.g engine out or jamming) that forces a diversion or unplanned landing. The new flight path is selected to maintain communications during contingency operations. However, the new flight plan is based entirely on the in-flight contingency and a database of static constraints available to the UAV communications system. The UAV may have no choice but to perform a node manoeuvre, and the system is designed to try and plan the path of the manoeuvre to maintain communications, but this does not take into account situations in which a node manoeuvre may be just one possible way of solving a communications issue and its suitability may need to be assessed against the over-arching mission goals.

SUMMARY

It is, therefore, an object of at least some aspects of the present invention to address at least one or more of these issues and, in accordance with a first aspect of the invention, there is provided apparatus for on-board management of communications in a mobile node comprising a communications system configured to effect wireless data communication between said mobile node and another node by means of at least one supported wireless communications link, wherein said apparatus comprises a node manoeuvre planning module and a dynamic route planner; said node manoeuvre planning module being configured to:
  identify that a wireless communications link associated with said mobile node (i) has been lost, degraded or is otherwise not optimal, and/or (ii) would violate an emissions control restriction;
  define a desired wireless communications link between said mobile node and said other node to (i) support wireless communications therebetween, and/or (ii) comply with said emissions control restriction;
  determine an attitude and/or position of said mobile node with respect to said other node required to support said desired wireless communications link;
  derive a node manoeuvre plan including data representative of said determined attitude and/or position of said mobile node and generate a plan metric in respect of said node manoeuvre plan; and
  transmit node manoeuvre plan data to said dynamic route planner, wherein said node manoeuvre plan data is configured to cause said dynamic route planner to derive a route plan designed to manoeuvre said mobile node to said determined attitude and/or position; said dynamic route planner being configured to:
  in response to receipt of said node manoeuvre plan data, generate a route plan designed to manoeuvre said mobile node to said determined attitude and/or position and generate corresponding route plan data; and provide said route plan data and data representative of said plan metric to a node authority with a request for authorisation.

In an exemplary embodiment, the mobile node may include a positioning system, and the node manoeuvre planning module may be configured to determine a current attitude and/or position of said mobile node using data from said positioning system.

The node manoeuvre plan may include attribute data indicative of a period of time to maintain said attitude and/or position of said mobile node.

In one exemplary embodiment, the node manoeuvre planning module may be communicably coupled to a communications manager associated with said mobile node, said communications manager being configured to receive data indicative that an antenna associated with a communications link being used by said mobile node is not optimally oriented with respect to said other node, and in response thereto, generate a node manoeuvre request and provide said node manoeuvre request to said node manoeuvre planning module, said node manoeuvre planning module being configured to generate said node manoeuvre plan and provide data representative thereof to said communications manager for transmission to said dynamic route planning module.

Optionally, the node manoeuvre planning module may be communicably coupled to a communications manager, said communications manager being configured to receive data indicative that a wireless communications link associated with said mobile node has been lost or degraded, and in response thereto, generate a node manoeuvre request and provide said node manoeuvre request to said node manoeuvre planning module, said node manoeuvre planning module being configured to generate said node manoeuvre plan and provide data representative thereof to said communications planner for transmission to said dynamic route planning module.

Optionally, the node manoeuvre planning module may be communicably coupled to a communications manager, said communications manager being configured to receive data indicative of emissions control restrictions associated with said mobile node and/or said other node, and in response thereto, generate a node manoeuvre request and provide said node manoeuvre request to said node manoeuvre planning module, said node manoeuvre planning module being configured to generate said node manoeuvre plan and provide data representative thereof to said communications manager for transmission to said dynamic route planning module.

In an exemplary embodiment, the node manoeuvre plan request may include attributes defining situational/environmental data representative of situational and/or environmental conditions in respect of said mobile node and/or affecting said wireless communications link, said situational/environmental data being received, by said communications manager, from one or more systems and/or functions of said mobile node.

The node manoeuvre planning module may be configured to derive said node manoeuvre plan using data representative of one or more of node velocity, antenna location, pointing and gain characteristics at said mobile node and/or said other node, mission environment, constraints, communications requirements in respect of said data to be transmitted, and predicted future trajectory of said other node over a predetermined period of time.

In accordance with another aspect of the present invention, there is provided a management system for a mobile platform, comprising a platform management module and apparatus according to preceding aspects, wherein said platform management module is configured to receive, from said node authority, data indicative of a positive or negative authorisation response and, in the event of a positive authorisation response, cause said node manoeuvre plan to be effected.

In accordance with another aspect of the present invention, there is provided a management system for a mobile platform, comprising a platform management module and apparatus according to any of the preceding claims, wherein said platform management module is configured to receive, from said node authority, data indicative of a positive or negative authorisation response and, in the event of a positive authorisation response, cause said node manoeuvre plan to be effected.

In accordance with yet another aspect of the present invention, there is provided a method of on-board management of communications in a mobile node comprising a communications system configured to effect wireless data communication between said mobile node and another node by means of at least one supported wireless communications link, the method comprising:

identifying that a wireless communications link associated with said mobile node (i) has been lost, degraded or is otherwise not optimal, and/or (ii) would violate an emissions control restriction;

defining a desired wireless communications link between said mobile node and said other node to (i) support wireless communications therebetween, and/or (ii) comply with said emissions control restriction;

determining an attitude and/or position of said mobile node with respect to said other node required to support said desired wireless communications link;

deriving a node manoeuvre plan including data representative of said determined attitude and/or position of said mobile node and generating a plan metric in respect of said node manoeuvre plan; and transmitting node manoeuvre plan data to a dynamic route planner, wherein said node manoeuvre plan data is configured to cause said dynamic route planner to derive a route plan designed to manoeuvre said mobile node to said determined attitude and/or position;

in response to receipt of said node manoeuvre plan data, generating a route plan designed to manoeuvre said mobile node to said determined attitude and/or position and generating corresponding route plan data; and providing said route plan data and data representative of said plan metric to a node authority with a request for authorisation.

BRIEF DESCRIPTION OF THE FIGURES

These and other aspects of the present invention will be apparent from the following specific description in which embodiments of the present invention are described, by way of examples only, and with reference to the accompanying drawings, in which:

FIG. 3 is a schematic diagram illustrating a system, including apparatus according to an exemplary embodiment of the present invention, for planning and managing a node manoeuvre in respect of a moving platform.

DETAILED DESCRIPTION

Figure 1:
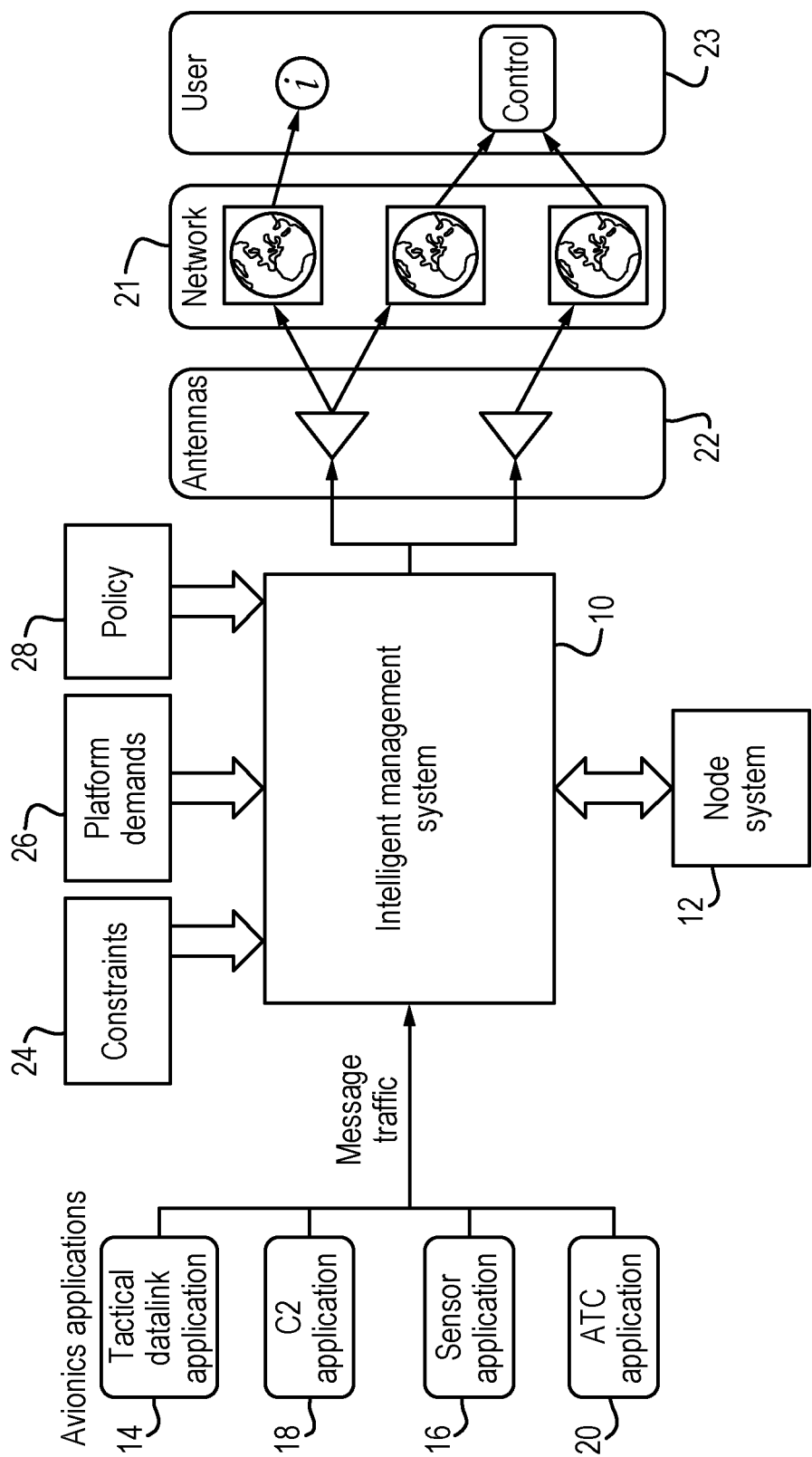
FIG. 1 is a schematic block diagram illustrating a moving platform management system, including apparatus according to an exemplary embodiment of the present invention.

Exemplary embodiments of the present invention provide an intelligent communications management system for optimising communications by causing manoeuvre of, for example, an air vehicle, whereby the dynamic route planner, dynamic communications planner and the vehicle management system work in concert to achieve this objective.

Traditionally, all aspects of communications, such as multiple, different communications links/radios, reside within the communications system. Each of the communications links/radios is an independent system and usually dedicated to transmitting specific messages. If, for example, an unexpected event occurs, such as a link failure or degradation, change in mission priorities and new operational constraints, the system is unable to adapt and respond accordingly to maintain adequate communications. The communications system is usually a dedicated system without much interaction, if any, with other platform systems and avionics applications on the platform. Furthermore, in some cases, a higher-level planner is required, which resides outside the communications system, to meet the changing demands of the platform and new operational constraints. In contrast, in aspects of the present invention, it is recognised that all systems/sub-systems on a mobile platform (e.g. mission management, airspace integration, communications system, and vehicle health management system) work in concert to achieve mission objectives and to maintain integrity of the platform. For example, the communications system may inform the platform health management system when a lost link situation arises to ensure that communications failure will not lead to a catastrophe. Thus, and as will be described in more detail later, the communications system is concerned with low-level decision making, i.e. day-to-day running and decisions. However, in aspects of the present invention, if it is unable to resolve a communications issue, for example, all available links to it have failed or severely degraded links or the recipient is not optimally orientated, then higher-level planning is invoked via apparatus according to exemplary embodiments of the present invention. In this case, apparatus is provided that uses data representative of mission environment and internal state of the moving platform to generate a platform manoeuvre plan intended to restore adequate connectivity. In some exemplary embodiment, a node manoeuvre request may be generated, with a view to manoeuvring the node to orient the transmitting antenna optimally for maintaining the required communications with respect to the recipient, without violating EMCON restrictions. In another exemplary embodiment, a node manoeuvre request may be generated with a view to manoeuvring the node to orient its receiving antenna with respect to a transmitting node.

The operational environment of a moving platform, in many different applications, comprises a plurality of nodes (e.g. fixed/mobile control station, manned and/or unmanned air vehicles) interacting with each other via different networks, exchanging, for example, Command and Control (C2), maintaining situational/environmental awareness, and cooperatively working together. In general, a node has multiple data links/radios to enable it to interact with other nodes via different networks, as required.

In the following description of the drawings, a communications management apparatus according to an exemplary embodiment of the invention will be described in relation to a UAV. However, it is to be understood that the present invention is not necessarily intended to be limited in this regard and, indeed, finds application in many other types of moving platform management systems in which it is required to manage communications in an intelligent manner and, for the avoidance of doubt, this would include road and sea-going vehicles, as well as manned aerial vehicles. The present invention also finds application in respect of the communications systems of mobile devices, such as mobile phones and the like, and this is to be understood throughout.

Referring to FIG. 1 of the drawings, an intelligent management module 10, including apparatus according to an exemplary embodiment of an aspect of the present invention, is illustrated schematically at the centre of a typical UAV. The UAV comprises a plurality of functions, including communications, navigation system, prognostics and health, etc. Thus, in the schematic diagram of FIG. 1, the intelligent communications management module 10 is incorporated in a first node and depicted as being communicably coupled to other parts 12 of the vehicle. It can be seen from the diagram that two-way data communication is provided between the rest of the vehicle 12 and the intelligent management module 10. The node system 12 may comprise a plurality of functional components/systems/subsystems, possibly including, but not necessarily limited to, a prognostics and health functional component, a navigation system, a control authority, e.g. pilot or an on-board authority with executive decision functionality, a utilities management functional component, defensive aids functional component, data transfer and recording functional component, and an HMI (Human Machine Interface) functional component. Any and all of these functional components are configured to provide information, such as navigation data and detected threat, to the intelligent communications management module 10 for use in its decision making.

The intelligent communications management module 10 is also configured to receive data from a plurality of avionics applications. Such avionics applications may, for example, comprise civil and/or military applications, such as tactical datalink applications 14, sensor applications 16 (e.g. video, images, etc), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not intended to be limited in this regard, and the type and receiver of communications managed by exemplary embodiments of the present invention may vary greatly, depending on application, system configuration and requirements.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas, etc). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the platform to be accessed by the intelligent management module 10 (and other system/sub-systems) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how communications links and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
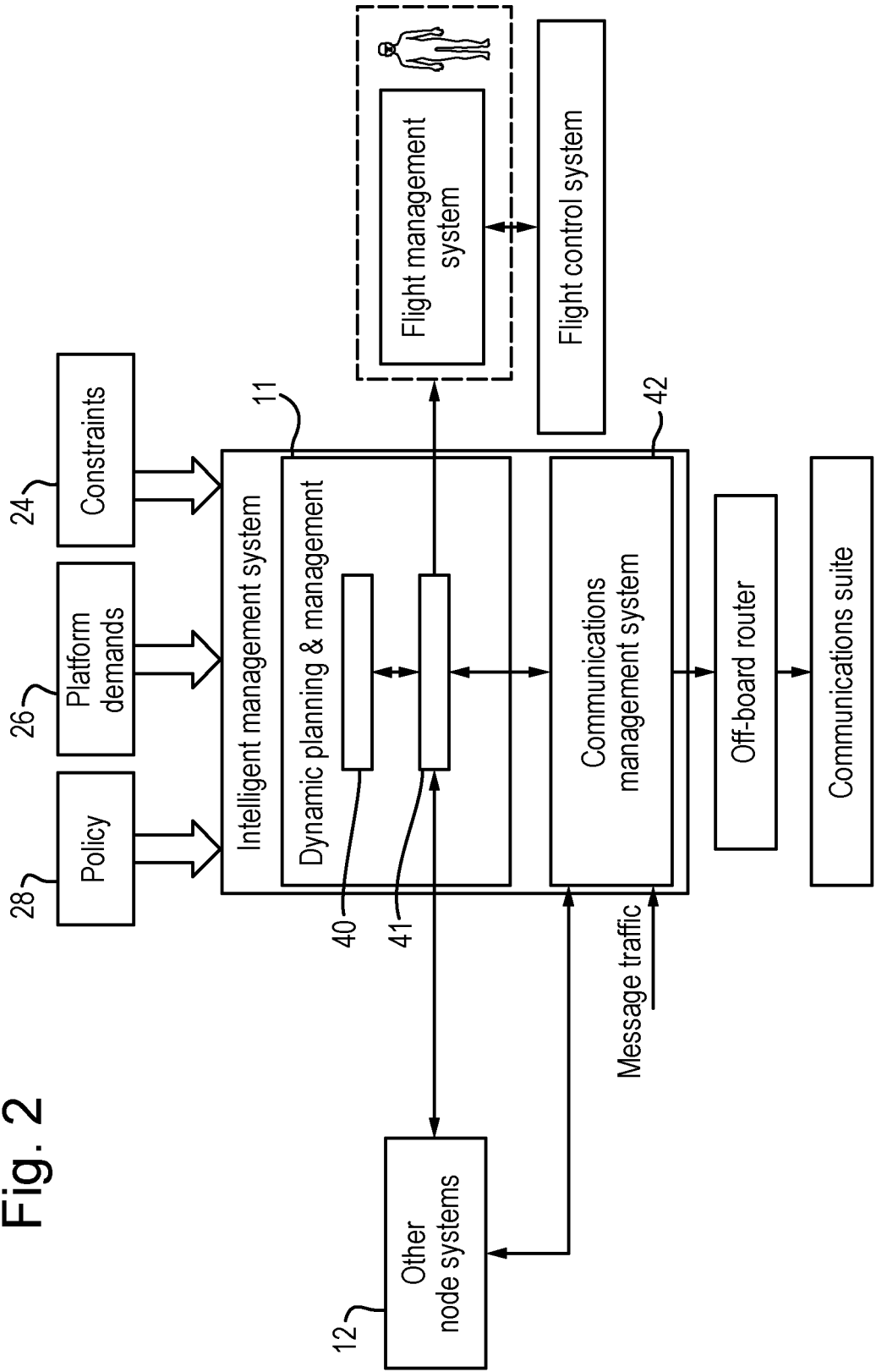
FIG. 2 is a schematic block diagram illustrating some principal features, in more detail, of an intelligent communications management system for the moving platform management system of FIG. 1.

Referring now to FIG. 2 of the drawings, the intelligent management module 10 comprises a dynamic planning and management module 11 and a communications management system 42. The communications management system 42 is concerned with low-level decision making. When it is unable to resolve certain communications issues, it is configured to generate a re-plan request to the dynamic planning and management module 11 (i.e. higher-level planning). According to the present invention, a manoeuvre plan may be generated for the platform to change the location and/or orientation of the aircraft in order to optimise communications. In a mobile device or manned vehicle application, apparatus according to an exemplary embodiment of the present invention may be configured to generate a request to a planning module incorporated therein, for the planning module to generate a platform manoeuvre plan which, if effected, is intended to guide a user to move the device or vehicle to a location and/or orientation that will maintain adequate network connectivity.

In the example shown, the dynamic planning and management module 11 comprises a dynamic planner 40 and a manager 41, that provides an interface between the dynamic planner 40 and the communications management system 42, as will be described in more detail below.

In prior art systems, as in exemplary embodiments of the present invention, at least parts of the node system 12 are communicably coupled to the communications management system 42 and the intelligent communications management system 10 works cooperatively with the rest of the node functional components and their subsystems to achieve the mission goal: to provide information for situational awareness and safety purposes, and to receive information used in its decision making.

The module 42 monitors and evaluates current network performance, so it is network-aware. Furthermore, motion-awareness enables the module 42 to intelligently route information along the best path to ensure connectivity to a fixed and/or mobile node is maintained, for example, in response to an unexpected and possibly a sharp manoeuvre, thereby enabling the communications management module 42 to dynamically adapt and respond to unexpected events, e.g. change in mission priorities, mission environment and network conditions.

Referring back to FIG. 2 of the drawings, dynamic planners are also widely known and used in many different applications. As explained above, a dynamic planner 40 is typically provided in respect of, for example, a UAV for planning its route/path from a start point (typically, but not always) to a defined end point (and optionally including any defined waypoints therebetween), as well as planning its manoeuvre and/or trajectory. Known dynamic planners (path, manoeuvre and trajectory) tend to base their path calculation on several factors such as terrain, threat, weather and platform constraints. For example, a new route plan may be calculated to avoid detection or a manoeuvre plan may be calculated to avoid an airborne obstacle. Other types of dynamic planners for route planning in many different applications will be known to a person skilled in the art and the present invention is not necessarily intended to be limited in this regard.

However, prior art systems are not configured to manoeuvre a platform to optimise communications by interacting with an on-board dynamic route planner and vehicle management system.

In contrast, in this exemplary embodiment of the present invention, a dynamic communications planning module is configured to dynamically generate a node manoeuvre plan (in real time) to best meet current mission objectives, based on its understanding of its mission environment, real-time link performance, installed communications links and antennas (including type, location on node, pointing and performance), position of other nodes in the vicinity and performance. The manager 41 is responsible for generating plan requests and providing attributes to the dynamic planner 40, evaluating new plans, selecting the best plan, requesting authorisation from the platform/pilot to execute the new plan, in order to optimise communications.

As explained above, and in general, if the communications management module 42 cannot adapt to meet current platform demands using integrated low-level planning functionality, then higher-level planning is invoked and a node manoeuvre plan may be generated.

Thus, with reference to the example given above, two nodes may not be optimally oriented with respect to each other to achieve a required information exchange, or the quality of the communications link between them can be constrained due to interference, for example. An object of exemplary embodiments of the invention is to generate a node manoeuvre plan in such cases that is designed to cause the node to be re-positioned to maintain a quality of service at an effective level.

Referring to FIG. 3 of the drawings, apparatus 141 according to an exemplary embodiment of the present invention, includes a communications planning module 150 and is communicably coupled to a communications manager 152. Under any of the circumstances described above, the communications system described above may transmit (to the communications manager 152) data indicative that a wireless communications link has been lost or degraded, in response to which the communications manager 152 generates a node manoeuvre request and transmits it to the communications planning module 150. In some exemplary embodiment, a node manoeuvre request may be generated, with a view to manoeuvring the node to orient the antenna optimally for maintaining the required communications with another node (e.g. with respect to a sender or recipient node), and in some cases without violating EMCON restrictions.

Subsequently, the approach described herein involves, firstly, the planning of a node manoeuvre in co-operation with the on-board dynamic route planner 11 and the calculation of a plan metric (and possibly a cost in terms of fuel used, etc) for a manoeuvre plan. Secondly, a plan proposal, together with the associated plan metric, is transmitted to the vehicle decision-maker (i.e. pilot or other on-board authority) for consideration. Lastly, the plan is accepted or rejected. If accepted, the communications manager is notified and the node manoeuvre is performed accordingly. If rejected, the communications manager 152 is informed accordingly, and a new node manoeuvre plan may be generated for consideration or an alternative solution is sought.

The method starts with determination of the optimal attitude (e.g. heading) and position of an on-board node, by considering a plurality of factors: node velocity, antenna location, pointing and gain characteristics at source and recipient, mission environment, constraints, communication requirements of one or more relevant applications, and predicted future trajectory (in relation to the current mission plan) of the recipient node over some period of time. The prediction can be based on position and heading as advertised by the recipient at some point during the mission or it can be inferred from previously received information. The step of determining the optimal attitude and position of the source node includes assessing the quality of the link (e.g. in terms of signal-to-noise ratio, throughput and/or latency) at the recipient as a function of the new node manoeuvre. In another implementation, to optimise reception (as opposed to transmission) at the moving platform, the step determines the optimal attitude and position of the moving platform with respect to the source (sender).

The on-board dynamic communications planner 150 determines the optimal attitude and position of the on-board node with respect to the recipient or source, derives a node manoeuvre plan to achieve that node attitude and position and also calculates a plan metric for the manoeuvre plan. The plan and associated metric will then be sent to the Communications Manager 152 for consideration. This step may also include an estimation (by the Communications Planner 150 or the Communications Manager 152) of a length of time to maintain the optimal attitude and position, in order to successfully communicate with the recipient or source (e.g. for 3 minutes).

The method proceeds with the Communications Manager 152 generating a request to the node's route planner 11 to devise a route plan to achieve the desired attitude and position, as determined in the previous step. In one exemplary embodiment, the Communications Manager 152 evaluates the plan received from Communications Planner 150 before raising a route plan request to be sent to the route planner 11.

At the next step, the on-board route planner 11 generates a route plan based on the attributes provided in the node manoeuvre plan/request received from the Communications Manager 152. In many cases, authorisation from a designated authority may be required to endorse the plan. Thus, the method proceeds with the step of raising a node manoeuvre request to a designated authority (e.g. the node's mission management system or a pilot) for approval, and the plan and associated plan metric (which in this context represents the benefit to the overall mission) is sent to the designated authority 154 for approval. It will be appreciated by a person skilled in the art that a plan metric is a measure that quantifies the expected results of executing a plan. The plan metric may be expressed in terms of benefit, cost or a combination of the two. Benefit is a measure of how 'good' the new plan is for communicating information over the network. Cost is a measure of the cost of a course of action in terms of the power required, time required, etc. to implement the plan. As an example only, the plan metric might be defined as: Plan Metric=Benefit Metric, or Plan Metric=(Benefit Metric/Cost Metric). Plan metric values may, for example, comprise integer values in the range between 1 and 10, in which an ideal plan has a plan metric value equal to 10.

The Communications Manager 152 is then informed if the plan is accepted or rejected. If the plan is rejected, an alternative solution may be sought. If a plan is accepted, the Communications Manager 152 provides respective data representative thereof to the communications system, and the on-board designated authority instructs the vehicle management system to carry out the manoeuvre.

It will be apparent to a person skilled in the art, from the foregoing description, that modifications and variations can be made to the described embodiments without departing from the scope of the present invention as defined by the appended claims.

The invention claimed is:

1. An apparatus for on-board management of communications in a mobile node comprising a communications system configured to effect wireless data communication between said mobile node and another node by means of at least one supported wireless communications link, wherein said apparatus comprises a node manoeuvre planning module and a dynamic route planner; said node manoeuvre planning module being configured to:
   identify that a wireless communications link associated with said mobile node (i) has been lost, degraded or is otherwise not optimal, and/or (ii) would violate an emissions control restriction;
   define a desired wireless communications link between said mobile node and said other node to (i) support wireless communications therebetween, and/or (ii) comply with said emissions control restriction;
   determine an attitude and/or position of said mobile node with respect to said other node required to support said desired wireless communications link;
   derive a node manoeuvre plan including data representative of said determined attitude and/or position of said mobile node and generate a plan metric in respect of said node manoeuvre plan; and
   transmit node manoeuvre plan data to said dynamic route planner, wherein said node manoeuvre plan data is configured to cause said dynamic route planner to derive a route plan designed to manoeuvre said mobile node to said determined attitude and/or position; said dynamic route planner being configured to:
   in response to receipt of said node manoeuvre plan data, generate a route plan designed to manoeuvre said mobile node to said determined attitude and/or position and generate corresponding route plan data; and
   provide said route plan data and data representative of said plan metric to a node authority with a request for authorisation.

2. The apparatus according to claim 1, wherein said mobile node includes a positioning system, and the node manoeuvre planning module is configured to determine a current attitude and/or position of said mobile node using data from said positioning system.

3. The apparatus according to claim 1, wherein said node manoeuvre plan includes attribute data indicative of a period of time to maintain said attitude and/or position of said mobile node.

4. The apparatus according to claim 1, wherein said node manoeuvre planning module is communicably coupled to a communications manager associated with said mobile node, said communications manager being configured to receive data indicative that an antenna associated with a communications link being used by said mobile node is not optimally oriented with respect to said other node, and in response thereto, generate a node manoeuvre request and provide said node manoeuvre request to said node manoeuvre planning module, said node manoeuvre planning module being configured to generate said node manoeuvre plan and provide data representative thereof to said communications manager for transmission to said dynamic route planning module.

5. The apparatus according to claim 1, wherein said node manoeuvre planning module is communicably coupled to a communications manager, said communications manager being configured to receive data indicative that a wireless communications link associated with said mobile node has been lost or degraded, and in response thereto, generate a node manoeuvre request and provide said node manoeuvre request to said node manoeuvre planning module, said node manoeuvre planning module being configured to generate said node manoeuvre plan and provide data representative thereof to said communications planner for transmission to said dynamic route planning module.

6. The apparatus according to claim 1, wherein said node manoeuvre planning module is communicably coupled to a communications manager, said communications manager being configured to receive data indicative of emissions control restrictions associated with said mobile node and/or said other node, and in response thereto, generate a node manoeuvre request and provide said node manoeuvre request to said node manoeuvre planning module, said node manoeuvre planning module being configured to generate said node manoeuvre plan and provide data representative thereof to said communications manager for transmission to said dynamic route planning module.

7. The apparatus according to claim 4, wherein said node manoeuvre plan request includes attributes defining situational/environmental data representative of situational and/or environmental conditions in respect of said mobile node and/or affecting said wireless communications link, said situational/environmental data being received, by said communications manager, from one or more systems and/or functions of said mobile node.

8. The apparatus according to claim 4, wherein said node manoeuvre planning module is configured to derive said node manoeuvre plan using data representative of one or more of node velocity, antenna location, pointing and gain characteristics at said mobile node and/or said other node, mission environment, constraints, communications requirements in respect of said data to be transmitted, and predicted future trajectory of said other node over a predetermined period of time.

9. A management system for a mobile platform, comprising a platform management module and the apparatus according to claim 1, wherein said platform management module is configured to receive, from said node authority, data indicative of a positive or negative authorisation response and, in the event of a positive authorisation response, cause said node manoeuvre plan to be effected.

10. A method of on-board management of communications in a mobile node comprising a communications system configured to effect wireless data communication between said mobile node and another node by means of at least one supported wireless communications link, the method comprising:
   identifying that a wireless communications link associated with said mobile node (i) has been lost, degraded or is otherwise not optimal, and/or (ii) would violate an emissions control restriction;
   defining a desired wireless communications link between said mobile node and said other node to (i) support wireless communications therebetween, and/or (ii) comply with said emissions control restriction;
   determining an attitude and/or position of said mobile node with respect to said other node required to support said desired wireless communications link;
   deriving a node manoeuvre plan including data representative of said determined attitude and/or position of said mobile node and generating a plan metric in respect of said node manoeuvre plan; and
   transmitting node manoeuvre plan data to a dynamic route planner, wherein said node manoeuvre plan data is configured to cause said dynamic route planner to derive a route plan designed to manoeuvre said mobile node to said determined attitude and/or position;

in response to receipt of said node manoeuvre plan data, generating a route plan designed to manoeuvre said mobile node to said determined attitude and/or position and generating corresponding route plan data; and providing said route plan data and data representative of said plan metric to a node authority with a request for authorisation.

\* \* \* \* \*